(No Model.)
J. BOWIE & W. C. BROWN.
LUBRICATING PUMP.
2 Sheets—Sheet 1.
No. 254,596. Patented Mar. 7, 1882.
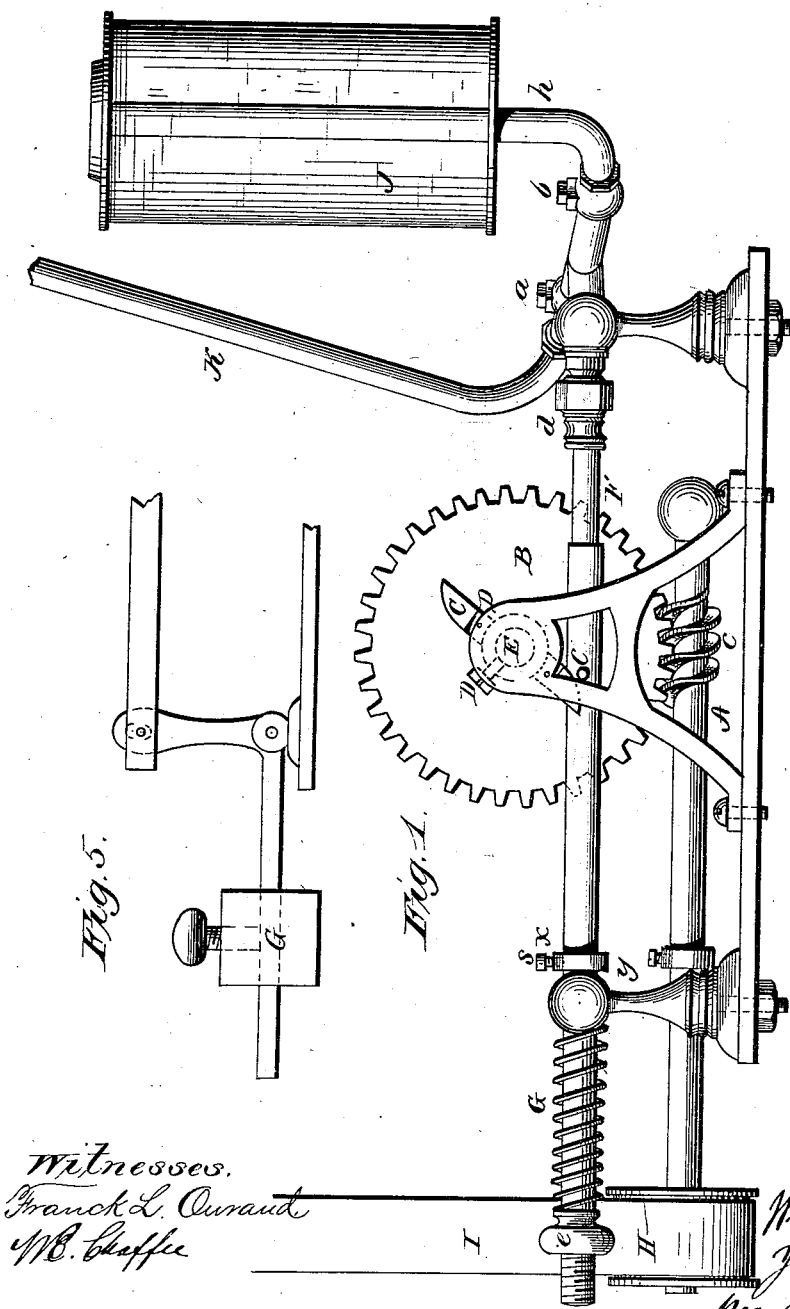

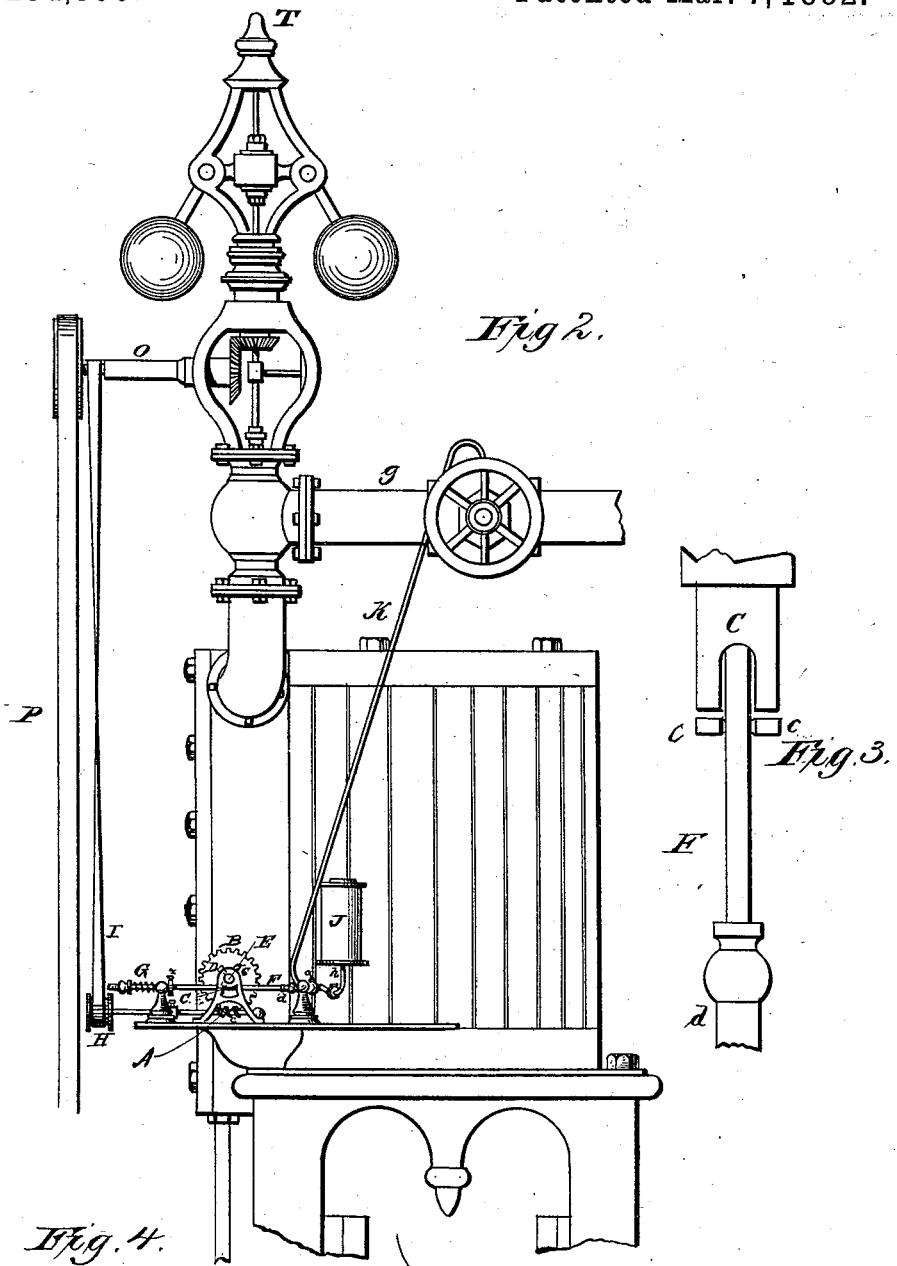

UNITED STATES PATENT OFFICE.

JOHN BOWIE AND WILLIAM C. BROWN, OF MANISTEE, MICHIGAN, ASSIGNORS, BY DIRECT AND MESNE ASSIGNMENTS, TO DOUVILLE & GIESMAN, OF SAME PLACE.

LUBRICATING-PUMP.

SPECIFICATION forming part of Letters Patent No. 254,596, dated March 7, 1882.

Application filed April 2, 1881. (No model.)

*To all whom it may concern:*

Be it known that we, JOHN BOWIE and WILLIAM C. BROWN, residents of Manistee, Manistee county, and State of Michigan, have invented a new and useful Improvement in Lubricating-Pumps, and in the application of certain machinery to a lubricating-pump, of which the following is a specification.

The invention consists in the application of the worm-wheel and worm and their motion, thus doing away with the usual clock-work of machinery, the cam attachment regulating the plunger, together with the spring or counterbalance-weight, as applied to a lubricating-pump of any kind.

In the accompanying drawings, similar letters of reference indicate like parts.

Figure 1 is an elevation of a device embodying our invention. Fig. 2 is a perspective view. Figs. 3, 4, and 5 are detail views.

In Fig. 1, $d$ is a cylinder. F is a piston, held and guided by the standard Y, and having a spring, G, extending from the standard Y to the nut $e$. This nut is made adjustable by having a screw-thread formed upon the piston F, by which the spring G may be made to exert a greater or less force. This piston has also a thimble-pin, C′, situated relatively to cam C, so that said cam will come in contact with it at each revolution of worm-wheel B, which said wheel is driven by worm $c$ upon shaft A. The shaft A is driven by the belt I and flange-pulley H. $x$ is a collar held by set-screw $s$. Said collar comes in contact with standard Y at the return of piston F after each stroke.

In the drawings, $a$ and $b$ are common check-valves, such as are ordinarily used in connection with force-pumps.

J is a chamber or well for holding a supply of oil, having a pipe, $h$, connecting it with cylinder $d$ to main steam-pipe $g$. Cam C and worm-wheel B are carried by shaft E, supported by standard D. This cam C is made adjustable, so that it may be extended or contracted by sliding the arms into or out of the socket formed upon shaft E, where they are held by set-screw D.

K is a discharge-pipe extending from cylinder $d$ to main steam-pipe $g$.

In Fig. 2 is shown the pump attached for operation, being connected by belt I to governor-shaft $o$ of the governor T, which is driven by belt P.

In Fig. 3 is shown the cam C, extending upon both sides of the piston F, prepared to act upon thimble-pins formed upon each side of said piston.

In Fig. 4 is shown the cam C reversed, as it should be used when a very short stroke is required.

Fig. 5 shows a counterbalance-weight, which may be substituted in place of spring G, when found desirable.

The pump being attached for operation, as shown in Fig. 2, having the well J filled with oil, and belt I attached to regulator-shaft $o$ and pulley H, a rotary motion will be imparted to shaft A and worm $c$, causing worm-wheel B and cam C to revolve with a slow steady motion until cam C comes in contact with thimble-pin C′, which causes piston F to move slowly forward, thus expelling the oil from cylinder $d$, and forcing it through check-valve $a$, up pipe K, and into main steam-pipe $g$, to be carried along said pipe into the engine-cylinder by the inflowing steam. Cam C having passed thimble-pin C′, spring G, having become compressed, will return piston F suddenly to its former position, causing the oil from well J to be drawn along pipe $h$, through check-valve $b$, into cylinder $d$, ready for another stroke, when this process is repeated.

The quantity of oil discharged into the engine-cylinder may be governed by changing the length of cam C, so that it will impart a long or short stroke to the piston F; also by sliding collar $x$ backward or forward upon piston F, graduating the return-stroke.

What we claim as novel, and desire to secure by Letters Patent, is as follows, viz:

1. In a lubricating-oil pump having cylinder $d$ and piston F, the spring G, cam C, worm $c$, worm-wheel B, and shaft A, all combined for operation substantially as herein shown and described.

2. In a lubricating-oil pump having cylinder $d$ and piston F, shaft A, the adjustable cam C, movable collar $x$ on piston F, and adjusting-nut E.

JOHN BOWIE.
WILLIAM C. BROWN.

Witnesses:
 GEO. R. GIESMAN,
 FLORENCE SULLIVAN.